Dec. 7, 1926.　　　　　　　　　　　　　　　　　　1,609,523
T. B. McLAUGHLIN
MACHINE FOR SLICING AND SQUEEZING LEMONS
Filed Feb. 11, 1926　　　2 Sheets-Sheet 1
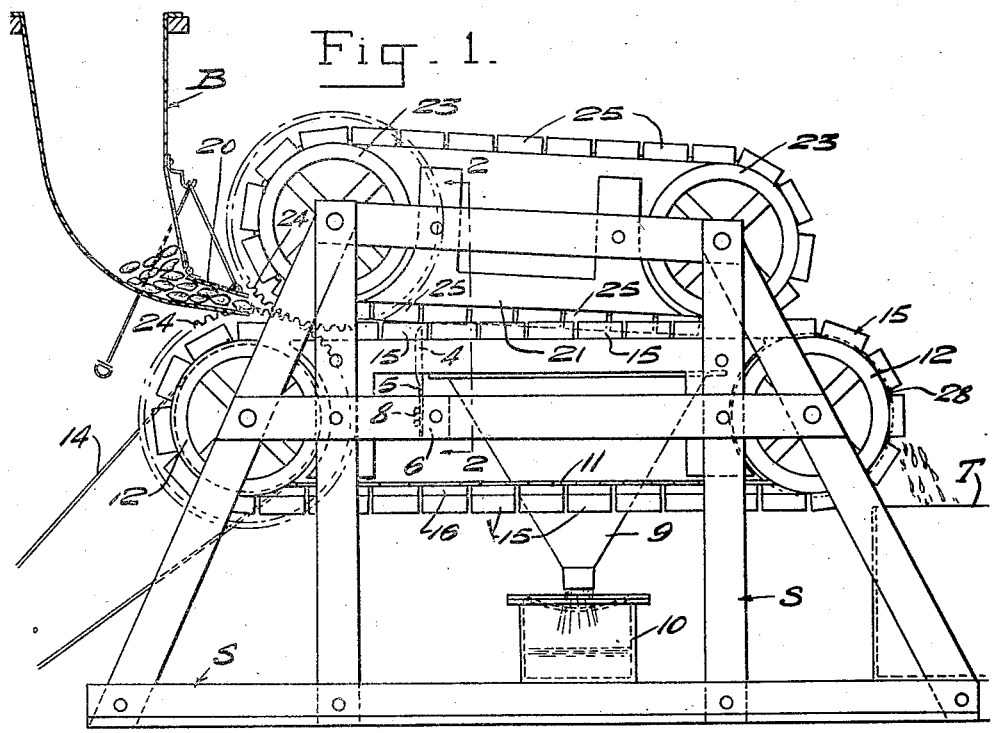
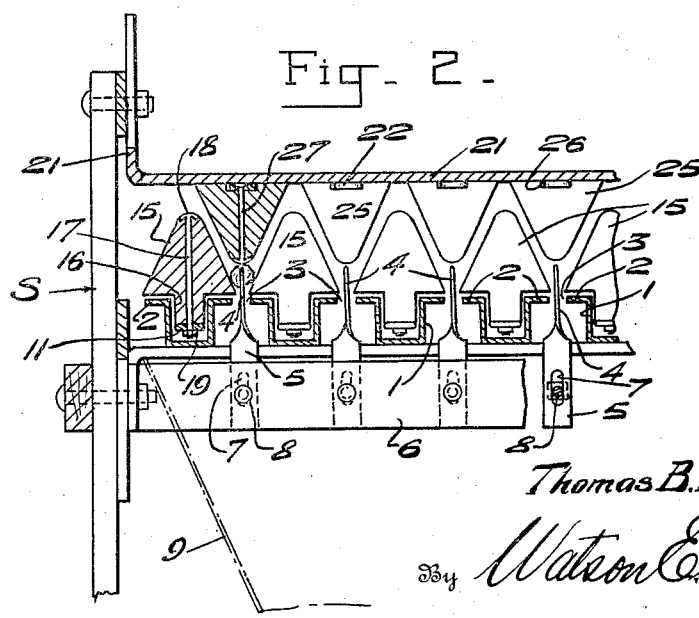
Inventor
Thomas B. McLaughlin
By Watson E. Coleman.
Attorney Dec. 7, 1926.  1,609,523
T. B. McLAUGHLIN
MACHINE FOR SLICING AND SQUEEZING LEMONS
Filed Feb. 11, 1926   2 Sheets-Sheet 2
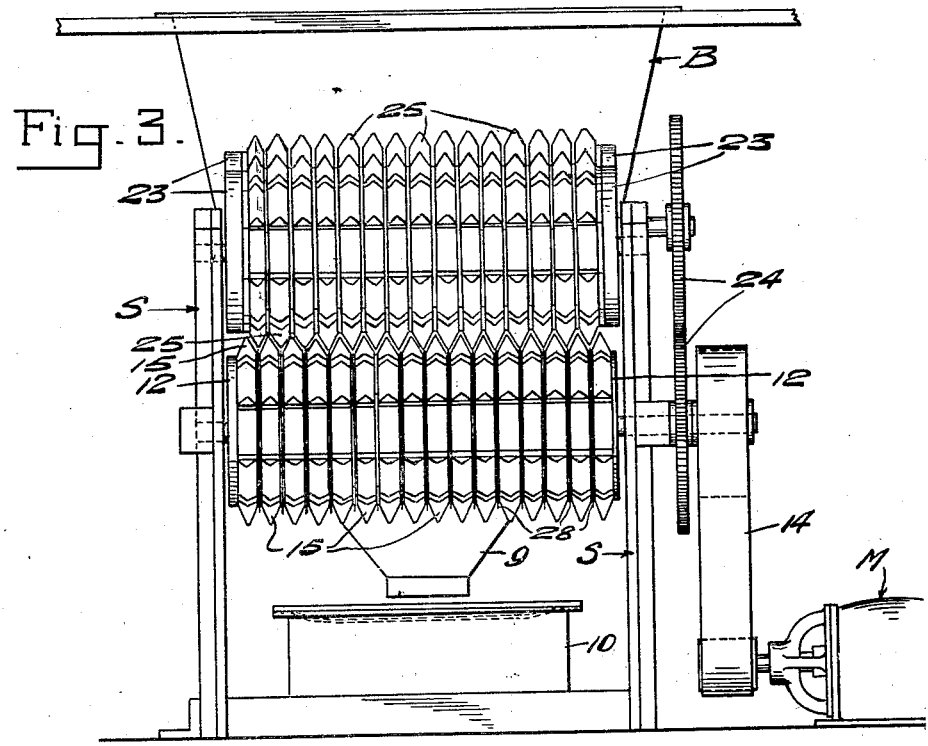
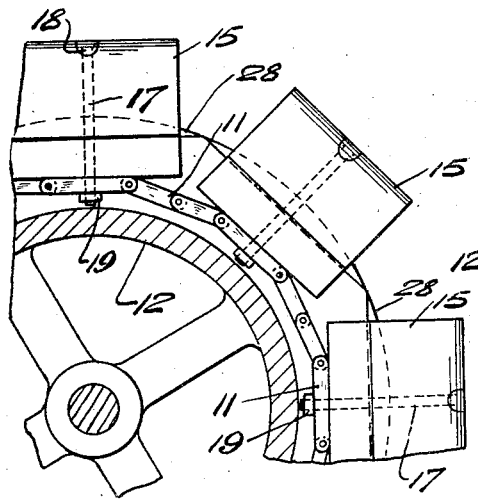
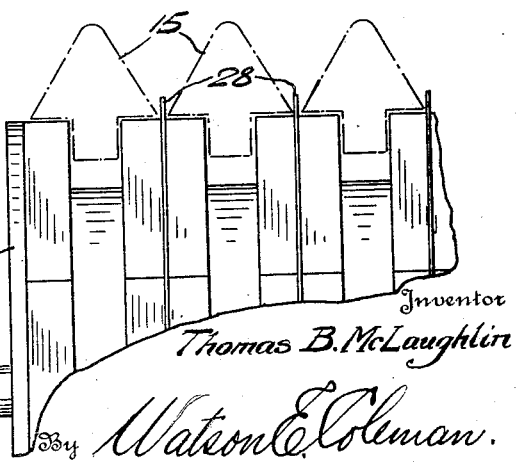

Patented Dec. 7, 1926.

1,609,523

UNITED STATES PATENT OFFICE.

THOMAS B. McLAUGHLIN, OF AUBURN, ILLINOIS.

MACHINE FOR SLICING AND SQUEEZING LEMONS.

Application filed February 11, 1926. Serial No. 87,658.

This invention relates to machines for slicing and squeezing lemons and it is an object of the invention to provide a machine of this kind wherein the squeezing medium also serves as a means to subject lemons to the cutting action of suitably positioned blades.

Another object of the invention is to provide a device of this kind wherein the juice of lemons or the like may be readily and conveniently obtained.

The invention consists in the details of construction and in the combination and arrangement of the several parts of my improved machine for slicing and squeezing lemons whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation with a portion in section illustrating a machine constructed in accordance with an embodiment of my invention;

Figure 2 is a fragmentary sectional view taken substantially on the line 2—2 of Figure 1;

Figure 3 is a view in end elevation of the structure as illustrated in Figure 1;

Figure 4 is an enlarged fragmentary view illustrating the mounting for the upper series of blocks;

Figure 5 is a fragmentary view illustrating the mounting for the lower series of blocks;

As disclosed in the accompanying drawings, S denotes a supporting structure provided with a series of longitudinally disposed parallel channel or U-shaped members 1 each of said members having its upper marginal portions provided therealong with the outstanding flanges 2, the flanges of adjacent members 1 being spaced apart to provide slots 3.

Extending upwardly through the slots 3 are the cutting blades 4 the lower portions of each of which being quarter-turned to provide a shank 5 having close contact with a vertical face of a cross member 6 carried by the structure S. The shank 5 is provided with a longitudinally directed slot 7 through which is disposed a clamping bolt 8 or the like carried by the cross member 6. By this means, each of the blades 4 may be vertically adjusted as the necessities of practice may prefer.

Suitably supported by the structure S and underlying the members 1 in advance of the knives or blades 4 is a hopper 9 discharging within a collecting vat 10 or otherwise as may be preferred.

Traveling in each of the members 1 is the upper stretch of an endless chain 11, said chain being disposed around the drums 12 rotatably supported by the structure S at the opposite ends thereof, one of said drums being in driven connection by the belt 14 or the like with a suitable source of power, such as an electric motor M.

Secured to the chain 11 at spaced points therealong are the blocks 15 each of which being triangular in cross section and having disposed along its base face at the transverse center thereof the flange 16 which is adapted to be snugly received within a member 1 with the portions of the base at opposite sides of said flange 16 adapted to have contact with the flanges 2 whereby said block when in the upper stretch of the chain 11 moves in a fixed path of travel. The block 15 is attached to a link of the chain 11 by a bolt 17 having at one end a cross head 18 conforming to the apex configuration of the block 15, while the opposite end of the bolt has engaged therewith a holding nut 19.

The blocks 15 carried by the upper stretches of adjacent chains 11 provide therebetween a substantially V-shaped trough into which are adapted to be delivered the lemons or the like to be split and squeezed. As herein disclosed, the lemons are delivered within the trough from a supply bin B arranged at the receiving end of the machine, the discharge from the bin B being under control of the adjustable gate 20.

Held in suitable position by the structure S and positioned above the members 1 is a plate 21 with which contacts from below the lower stretches of the endless chains 22 passing around the drums 23 suitably supported by the upper end portions of the structure S, the drum at the receiving end of the machine being in driven connection by the gears 24 or the like with the adjacent drum 12. This plate 21 is inclined longitudinally and downwardly from the receiving end of the machine to the delivery end so that the blocks 25 carried by the lower stretches of the chains 22 will gradually enter within the troughs between adjacent series of blocks 15 and thus effectively squeeze the lemons or the like within said troughs.

The chains 11 and 22 travel at the same speed and the blocks 15 and 25 also operate to effect initially a sufficient grip or tension upon the lemons or the like to cause the same to pass beyond the knives or blades 4 to assure the requisite splitting of the fruit. After passing the blades or knives 4 the blocks 15 and 25 coact to impose requisite pressure upon the split lemons to squeeze the juices therefrom and which juices are discharged within the hopper 9 and collected within the vat 10.

Each of the blocks 25 is also substantially triangular in form and is provided along its base face at the transverse center thereof with a groove or channel 26 in which is received adjacent links of a chain 22 and said block is anchored to one of said links by a bolt 27 similar to the bolt 17 hereinbefore referred to.

The skin and pulp of the lemons are readily discharged into a refuse tank T or the like as illustrated in Figure 1.

The drum 12 or cylinder, as it may be called, is provided between adjacent series of blocks 15 with an outstanding flange 28 of sufficient height to assure the ejection of the squeezed lemons as the blocks 15 pass around the drum or cylinder 12.

From the foregoing description it is thought to be obvious that a machine for slicing and squeezing lemons constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus for slicing and squeezing lemons and the like comprising, in combination, a series of endless members arranged side by side, a second series of endless members arranged side by side and positioned above the first named series, outstanding blocks carried by said endless members, the blocks of adjacent endless members of the lower series providing troughs therebetween, the blocks of the endless members of the upper series traveling within said troughs, means for imparting movement to the endless members, and cutting means extending within the troughs.

2. An apparatus for slicing and squeezing lemons and the like comprising, in combination, a series of endless members arranged side by side, a second series of endless members arranged side by side and positioned above the first named series, outstanding blocks carried by said endless members, the blocks of adjacent endless members of the lower series providing troughs therebetween, the blocks of the endless members of the upper series traveling within said troughs, means for imparting movement to the endless members, and cutting means extending within the troughs, the blocks carried by both series of endless members being V-shaped in cross section with their apices outwardly disposed with respect to the endless members.

3. An apparatus for slicing and squeezing lemons and the like comprising, in combination, a series of endless members arranged side by side, a second series of endless members arranged side by side and positioned above the first named series, outstanding blocks carried by said endless members, the blocks of adjacent endless members of the lower series providing troughs therebetween, the blocks of the endless members of the upper series traveling within said troughs, means for imparting movement to the endless members, cutting means extending within the troughs, and means extending between the upper stretches of the lower series of endless members at the discharge end portions of said stretches to provide positive means for ejecting lemons and the like pressed within the troughs between the blocks carried by adjacent of said endless members.

4. An apparatus for slicing lemons and the like comprising a series of endless members arranged side by side, a second series of endless members arranged side by side and positioned above the first named series, outstanding blocks carried by said endless members, the blocks of adjacent endless members of the lower series providing troughs therebetween, the blocks of the endless members of the upper series traveling within said troughs, and means for imparting movement to the endless members.

In testimony whereof I hereunto affix my signature.

THOMAS B. McLAUGHLIN.